(12) United States Patent
Friedrich et al.

(10) Patent No.: US 7,095,628 B2
(45) Date of Patent: Aug. 22, 2006

(54) FUSE BOX FOR A VEHICLE

(75) Inventors: Norbert Friedrich, Rauhenaurach (DE); Dean McDermott, Birmingham (GB)

(73) Assignee: Leoni Bordnetz-Systeme GmbH & CO KG, Nuremberg (DE)

( * ) Notice: Subject to any disclaimer, the term of this patent is extended or adjusted under 35 U.S.C. 154(b) by 25 days.

(21) Appl. No.: 10/852,963

(22) Filed: May 24, 2004

(65) Prior Publication Data

US 2004/0252446 A1    Dec. 16, 2004

(30) Foreign Application Priority Data

May 24, 2003   (DE)   ................ 103 23 550

(51) Int. Cl.
*H01H 85/20* (2006.01)
*H01B 7/06* (2006.01)

(52) U.S. Cl. .................... 361/833; 174/71 B

(58) Field of Classification Search ............. 361/833, 361/814, 601, 611, 622, 624, 626; 174/71, 174/50, 69, 68.2, 52.1; 439/621
See application file for complete search history.

(56) References Cited

U.S. PATENT DOCUMENTS

| | | | |
|---|---|---|---|
| 3,848,951 A * | 11/1974 | Michaels et al. ........... 439/357 |
| 4,355,853 A | 10/1982 | Kourimsky | |
| 4,429,943 A * | 2/1984 | Inoue .................... 439/721 |
| 4,685,753 A * | 8/1987 | Isshiki et al. .............. 439/74 |
| 5,011,417 A * | 4/1991 | Matsumoto et al. ....... 439/76.2 |
| 5,067,905 A * | 11/1991 | Matsumoto et al. ....... 439/76.2 |
| 5,179,503 A * | 1/1993 | Fouts et al. ............... 361/729 |
| 5,314,354 A * | 5/1994 | Nomura et al. ........... 439/621 |
| 5,438,310 A | 8/1995 | Ikari | |
| 5,556,305 A * | 9/1996 | Naegelin ................... 439/622 |
| 5,645,457 A * | 7/1997 | Hirayama et al. .......... 439/801 |
| 5,679,924 A * | 10/1997 | Young et al. ............... 174/50 |
| 5,903,445 A * | 5/1999 | Nakamura et al. .......... 361/833 |
| 5,980,302 A * | 11/1999 | Saka ........................ 439/404 |
| 5,994,976 A * | 11/1999 | Tang ........................ 333/100 |
| 6,066,803 A * | 5/2000 | Hagarty .................... 174/50 |
| 6,414,241 B1* | 7/2002 | O'Donnell ................ 174/57 |
| 6,576,835 B1* | 6/2003 | Ford et al. ................. 174/50 |
| 6,707,689 B1* | 3/2004 | Momota et al. ............ 361/833 |
| 6,841,730 B1* | 1/2005 | Medeiros et al. ........... 174/50 |
| 6,848,946 B1* | 2/2005 | Vicenza et al. ............ 439/622 |

FOREIGN PATENT DOCUMENTS

| | | |
|---|---|---|
| DE | 32 25 319 C2 | 1/1984 |
| DE | 296 07 130 U1 | 7/1996 |
| DE | 296 07 130 U1 | 8/1996 |
| DE | 200 01 196 U1 | 5/2000 |
| DE | 199 59 272 A1 | 6/2001 |

* cited by examiner

Primary Examiner—Kamand Cuneo
Assistant Examiner—Hung Thanh Nguyen
(74) Attorney, Agent, or Firm—Laurence A. Greenberg; Werner H. Stemer; Ralph E. Locher

(57) ABSTRACT

A fuse box for a vehicle contains a base box having a housing in which a first bus bar with a battery connection terminal is disposed. The fuse box is configured according to a modular system. For this purpose, the housing is provided for the attachment of an extension box. The extension box preferably has a second bus bar that is placed in contact with the first bus bar. As a result of the modular system with the extension box, it is possible, for example, to allow for extensions in a vehicle on-board power system with little expenditure in respect of the fuse box.

19 Claims, 5 Drawing Sheets

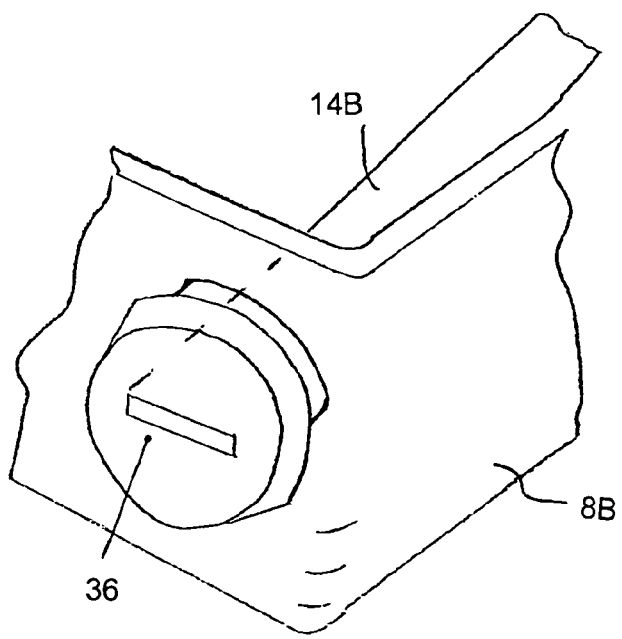
FIG. 5B
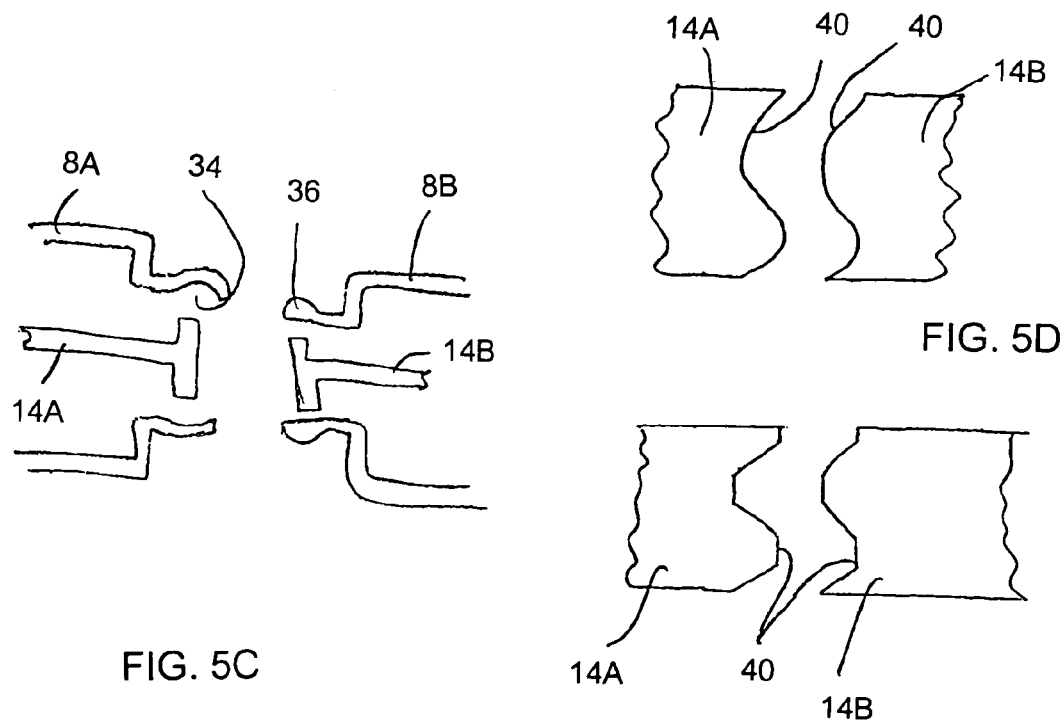
FIG. 5C
FIG. 5D
FIG. 5E

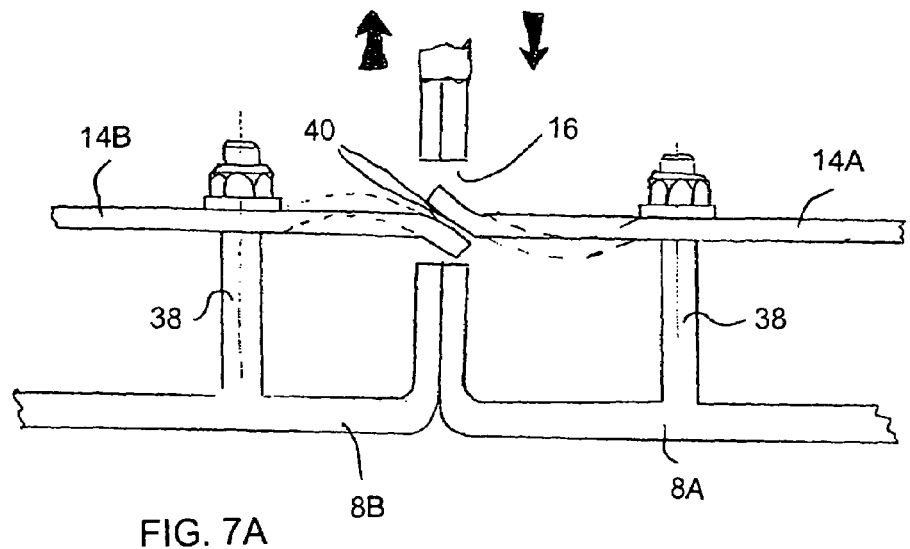
FIG. 7A
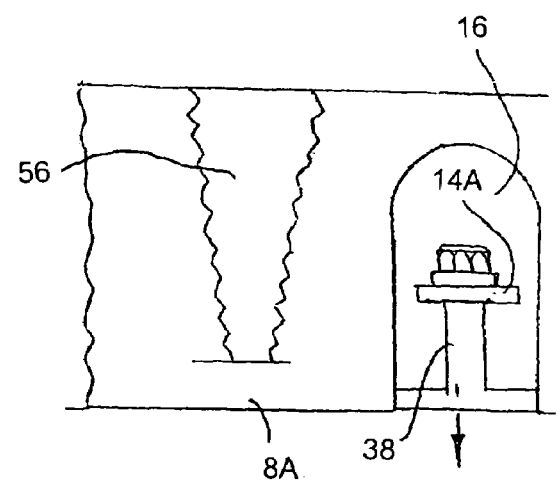
FIG. 7B
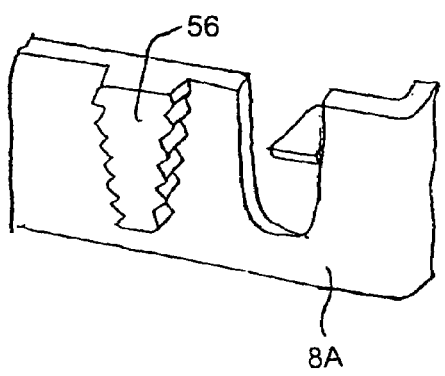
FIG. 7C
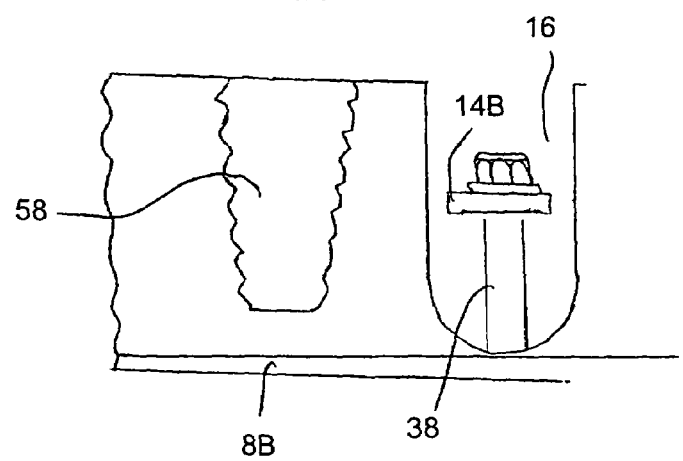

FUSE BOX FOR A VEHICLE

BACKGROUND OF THE INVENTION

Field of the Invention

The invention relates to a fuse box for a vehicle having a housing in which a first bus bar that has a battery connection terminal is disposed.

In the field of motor vehicles, such a fuse box, also referred to as a primary fuse box, is usually disposed in the engine cavity, directly in the vicinity of the battery. The individual parts of a vehicle on-board power system are protected by the fuse box. In order to protect individual loads, further fuses may be disposed in a decentralized fashion, for example in the passenger compartment. The fuse box has a bus bar having a battery connection terminal via which the fuse box is connected to the battery of the vehicle in the mounted state. The energy that is made available by the battery is distributed to the individual parts of the vehicle on-board power system via the bus bar.

Published, Non-Prosecuted German Patent Application DE 199 59 272 A1 discloses such a fuse box which is referred to as a primary fuse box and which has a bus bar which is divided in two so that the fuse box can be used both for single-battery systems and for two-battery systems without relatively large modifications to the vehicle on-board power system. A further example of a primary fuse box can be found, for example, in German Utility Model DE 296 07 130 U1.

The configuration of the vehicle on-board power system usually depends on the specific customer requirements so that even with one particular type of vehicle there are different vehicle on-board power system variants owing to different equipment variants. Owing to the large number of electrical loads that are now used in vehicles, the vehicle on-board power system variants may differ considerably in their scope between a basic equipment level and a higher comfort equipment level. In trucks or construction machinery, the vehicle on-board power systems may also differ considerably in their scope, depending on which additional functionalities and thus additional loads are provided for the vehicle. Since the energy is distributed to the loads via the fuse box, they must be configured for the maximum vehicle on-board power system variant. In addition, it is advantageous if more space remains free for possible retrofitted items. A fuse box that is configured for the maximum vehicle on-board power system variant is over dimensioned for the vehicle on-board power system variant in the basic equipment level and takes up a large amount of installation space. However, in modern vehicles the installation space in the engine cavity is highly restricted.

SUMMARY OF THE INVENTION

It is accordingly an object of the invention to provide a fuse box for a vehicle which overcomes the above-mentioned disadvantages of the prior art devices of this general type, which is suitable for a wide spectrum of vehicle on-board power system variants.

With the foregoing and other objects in view there is provided, in accordance with the invention, a fuse box for a vehicle. The fuse box contains a base box having a housing, a first bus bar having a battery connection terminal and disposed in the base box, fuses disposed in the base box, a plurality of outgoing connecting lines connected to the first bus bar through the fuses, an extension box configured for attachment to the base box, and a second bus bar disposed in the extension box.

Accordingly, the fuse box contains a housing which is configured for the attachment of an extension box. The fuse box is therefore based on a modular concept, containing a base box and an extension box. As a result of this measure, the base box only needs to be configured for a vehicle on-board power system of a basic equipment level with a predetermined scope. The fuse box module concept is suitably expanded by the configuration of the extension box only if a certain scope of equipment is reached or, if appropriate, electrical loads are retrofitted and the base box is no longer sufficient. As a result of the attachment of the extension box to the housing of the base box, the additional wiring expenditure is kept small, and in particular there is thus the possibility of resorting to specific functionalities that are contained in the base box. A further advantage of supplementation by the extension box relates to the fact that the base box does not need to be modified when the vehicle on-board power system is extended, and in particular also does not need to be opened. This is of particular interest with respect to technical safety issues since considerable consequential damage may occur given inappropriate treatment or handling.

In one expedient development, there is provision for the first bus bar to be configured to make contact with the second bus bar. As a result, the second bus bar is therefore connected to the battery via the first bus bar and the battery connection terminal that is assigned to the first bus bar. Therefore, as a result of this measure the need for a second separate battery connection for the extension box is eliminated.

According to one preferred development, the extension box therefore has, apart from the need for making contact with the two bus bars, only connections to the parts of the vehicle on-board power system at the output end. The power supply to the extension box is provided exclusively via the first bus bar of the base box.

In one advantageous configuration, breakthroughs are provided or prepared on the base box and the extension box in order to make contact with the bus bars in a simple and space-saving fashion. The bus bars are therefore completely integrated into the respective housing of the base box or the extension box and do not protrude.

With respect to the modular overall concept in which the base box can in principle also be used alone and is only extended with the extension box when necessary, there is expediently provision for the base box to be closed in the basic state, that is to say without a connected extension box, that is to say in particular for the breakthrough to be closed with respect to the bus bar which is disposed in the base box. The bus bar is therefore not accessible from the outside.

In order to make contact between the two bus bars as simply as possible, they are preferably configured so that they can be placed directly in contact with one another, or they are placed directly in contact with one another when the extension box is mounted.

In order to easily connect the base box and the extension box, the latter are configured so that they can be stacked one on top of the other. Alternatively, they can be disposed one next to the other.

In one preferred configuration, the bus bars are configured and disposed in this respect in such a way that when the housing of the base box is connected to the extension box they are automatically placed in contact with one another. This permits simple and rapid mounting without complex measures being necessary. In particular, the second bus bar is placed in contact here with the first bus bar without intervention in the base box having to be performed. For example, the lid that is usually sealed does not need to be removed. Instead it is sufficient if the base box has, for making contact with the second bus bar, a separate connection region that is provided for this purpose and is formed, in particular, by the breakthrough.

For the sake of simple mounting, the two boxes are preferably connected to one another by a screw connection or latching connection, being in particular plugged together or disposed one against the other. In this configuration, the two boxes are preferably connected in the region of the bus bars in order to ensure reliable contact between the two bus bars.

In order to ensure particularly reliable contact between the bus bars, they are guided in the connected state of the two boxes by the screw connection or latching connection by which the two boxes are connected to one another. This has the significant advantage that, with the connecting force which is exerted by the screw connection or latching connection, not only the two boxes but also at the same time the two bus bars are placed in contact with one another, in particular clamped or pressed one against the other.

In order to clamp them one against the other, the bus bars are held in a sprung position in the region of their opposite contact faces. In order to bring this about, a counter bearing is expediently provided for the respective bus bar.

Other features which are considered as characteristic for the invention are set forth in the appended claims.

Although the invention is illustrated and described herein as embodied in a fuse box for a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 5B is a diagrammatic, perspective view of one of the parts of the latching connection shown in FIG. 5A;

FIG. 5C is a diagrammatic, sectional view of a modified configuration of the latching connection of the first embodiment variant;

FIGS. 5D and 5E are diagrammatic, sectional views of examples of bus bars with a contoured end face;

FIG. 7A is a diagrammatic, side view of a third embodiment variant in which the bus bars are of a sprung configuration and are pressed one against the other counter to the spring force;

FIG. 7B is an illustration of a configuration of a further latching connection; and FIG. 7C is a perspective view of one of the parts of the further latching connection which are illustrated in FIG. 7B.

DESCRIPTION OF THE PREFERRED EMBODIMENTS

Figure 1:
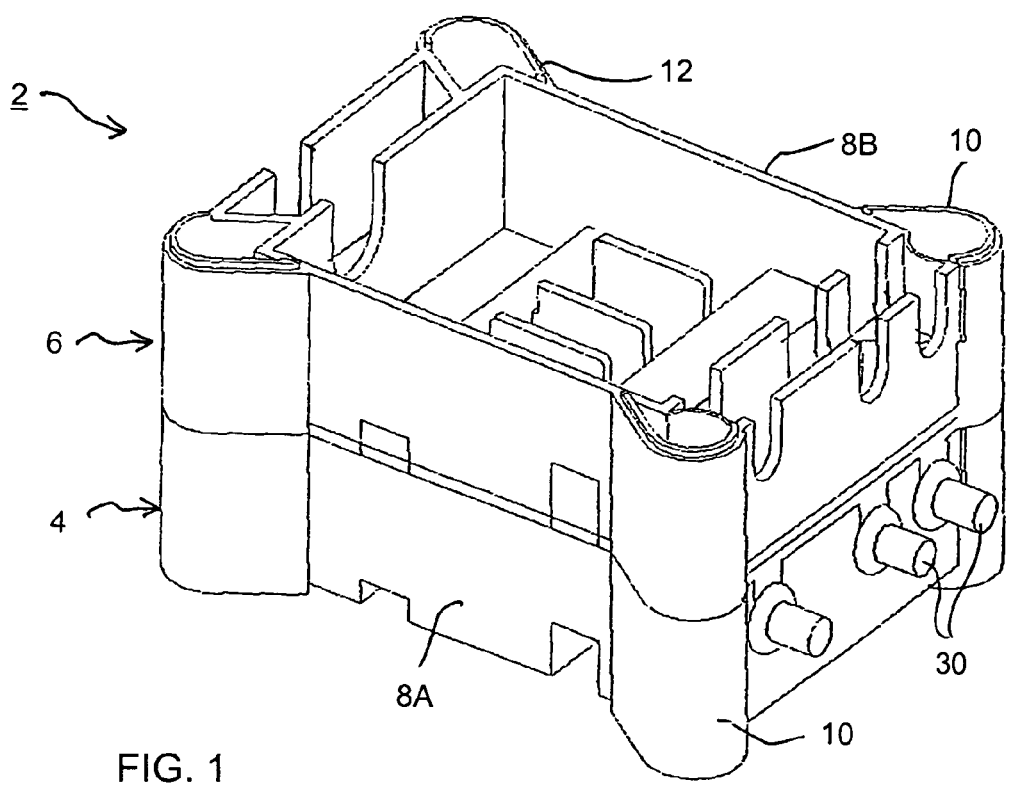
FIG. 1 is a diagrammatic, perspective view of a fuse box having a base box with a stacked extension box according to the invention.

In all the figures of the drawing, sub-features and integral parts that correspond to one another bear the same reference symbol in each case. Referring now to the figures of the drawing in detail and first, particularly, to FIG. 1 thereof, there is shown a fuse box 2 which contains a base box 4 and an extension box 6 which are stacked one on top of the other. To permit stacking, the base box 4 has a housing 8A that contains four stacking sleeves 10 on the edges at its corners. A housing 8B of the extension box 6 has the same basic surface and is in particular constructed identically with stacking sleeves 10. The stacking sleeves have a collar 12 on their upper side and a non-illustrated groove corresponding to the collar 12 on their underside so that the two boxes 4, 6 can be stacked one on top of the other in the manner of modules. As a result of this configuration, the fuse box 2 is constructed in the manner of a modular system and can in principle also be extended with more than one extension box 6.

Figure 2:
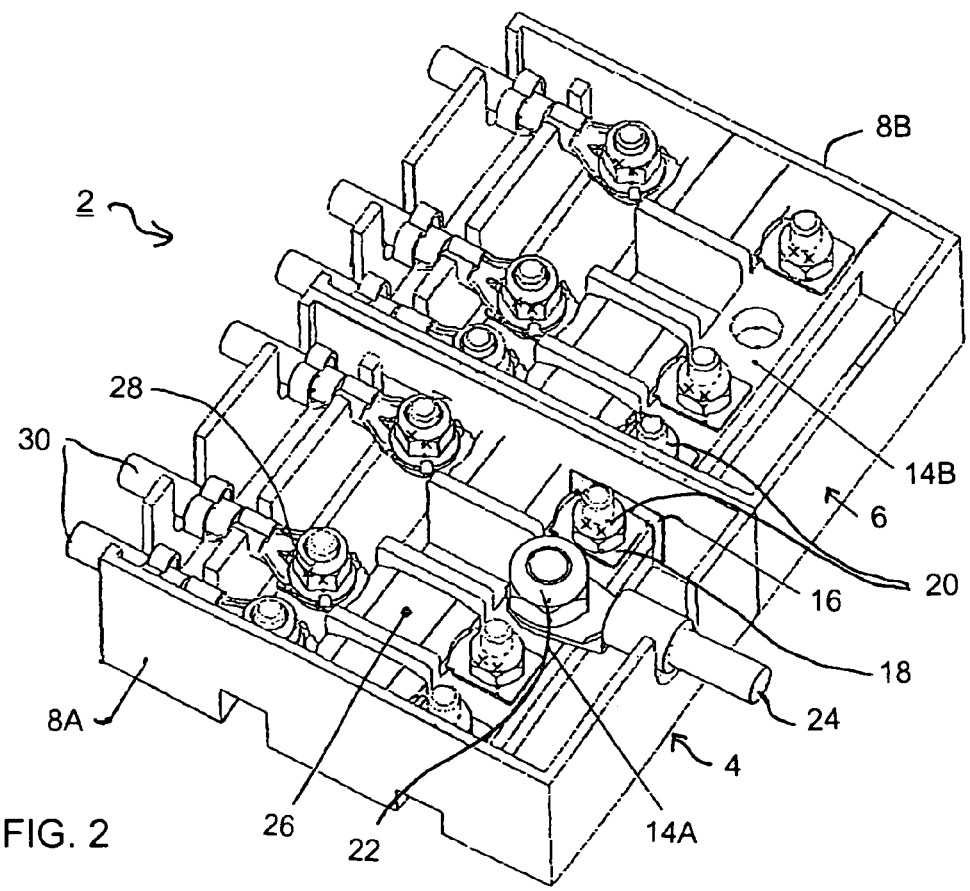
FIG. 2 is a diagrammatic, top perspective view of the extension box disposed against the base box.

In contrast to FIG. 1, the primary fuse box 2 according to FIG. 2 is formed by disposing the base box 4 and the extension box 6 next to one another. The two boxes 4, 6 are preferably pushed or plugged one against the other for this purpose and are connected to one another, for example, by a dovetail connection which acts between the two housings 8A, 8B. The two boxes 4, 6 have a clamping space in their interior. A first continuous and interruption-free bus bar 14A is disposed in the base box 4, and a second continuous and interruption-free bus bar 14B is disposed in the extension box 6. In the region of the bus bars 14A, 14B, the two housings 8A, 8B each have a breakthrough 16 through which the bus bars 14A, 14B are guided in order to make contact with one another. The two bus bars 14A, 14B are connected, for example, by a current conductor plate 18 which extends through the breakthrough 16 and which is attached to the two bus bars 14A, 14B by screws 20. The breakthrough 16 is not formed or opened until the extension box 6 is connected to the base box 4. In the basic state of the base box 4, the breakthrough 16 is first closed in order to ensure that the clamping space in the interior of the base box 4 is sealed. The breakthrough 16 can be closed, for example, by a rubber bush or be configured as a housing part which has a relatively thin wall and can be broken away.

Only the first bus bar 14A has a battery connection terminal 22 to which a current line 24 is connected, the current line 24 being connected to a non-illustrated pole of a vehicle battery. As a result of the two bus bars 14A, 14B being connected to one another, they are at the same potential. The bus bars 14A, 14B are each connected by fuses 26 to connection terminals 28 to which connection lines 30 for supplying specific parts of the vehicle on-board power system are connected.

In order to keep the costs low, the two housings 8A, 8B are preferably constructed identically and, for example, as plastic injection molded parts. In the basic state with the boxes 4, 6, the necessary opening in the housing 8A for the current line 24 is therefore preferably sealed by a bush, or formed by a housing element which can be broken away.

The modular configuration of the fuse box 2 has the following advantages: for a very wide variety of vehicle variants a common base box 4 which is configured in a uniform fashion and has a compact configuration, and therefore requires little installation space, is provided. If extensions are necessary, for example because specific supplementary functions have to be made available or because specific supplementary functions are to be retrofitted, it is not necessary to replace the base box 4. Instead it is sufficient to extend by the extension box 6. For this reason, there is no need to develop a completely new fuse box. Owing to the preferably identical configuration of the base box 4 and extension box 6, a large number of components, for example bus bars 14A, 14B, connection terminals 28 etc., are identical and do not need to be specifically adapted. Furthermore, only one mold—possibly with inserts with a region of the connection from the base box 4 to the extension box 6—is necessary to manufacture the base box 4 and extension box 6. As a result, the development and manufacturing costs are kept low. In addition, this modular system permits a flexible adaptation to the respective requirements of the vehicle on-board power system. Furthermore, the direct connection of the two bus bars to one another is of particular advantage since as a result only one connection to the pole of the battery is necessary. In the engine cavity of a motor vehicle that is usually highly restricted, there is therefore no need to lay an additional line to the battery. In terms of safety aspects, it is also advantageous to supply current via only one current line 24. This also considerably simplifies the mounting. A further important aspect is the fact that the base box 4 that is closed in the installed state does not necessarily need to be opened in order to arrange the extension box 6. This is advantageous, on the one hand, for the necessary seal and also in terms of safety aspects. It would be possible to detect, for example, immediately that the base box 4 had been tampered with from the fact that it had been opened without authorization.

Figure 3:
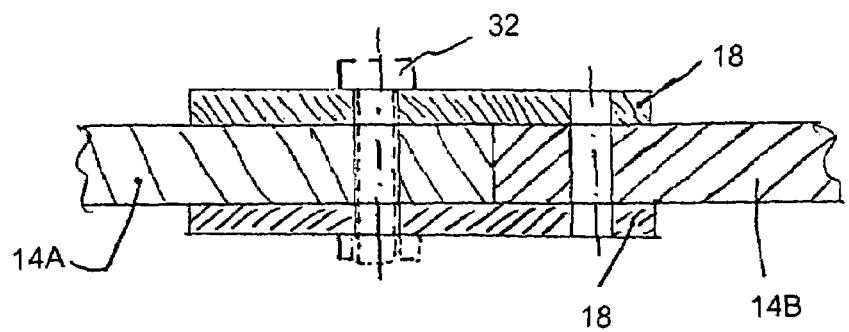
FIG. 3 is a diagrammatic, sectional view through a contact region between the two bus bars that are connected to one another by a current conductor plate.
Figure 4:
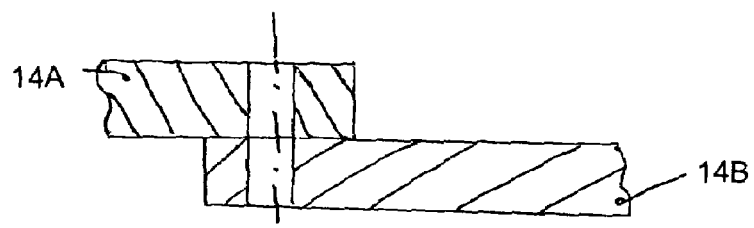
FIG. 4 is a diagrammatic, sectional view in which the two bus bars are placed in contact with one another directly by a connecting element.

The connection between the two bus bars 14A, 14B via a current conductor plate 18 as already mentioned with respect to FIG. 2 can be seen in an enlarged illustration in FIG. 3. According to this exemplary embodiment, the two bus bars 14A, 14B are clamped in between two opposite current conductor plates 18 by connecting elements 32 (screw illustrated by dashed line). The connecting element 32 is guided here through aligned drilled holes in the current conductor plates 18 and the bus bars 14A, 14B. Instead of the connection by the current conductor plates 18, the two bus bars 14A, 14B can also overlap and can be directly clamped one against the other using the connecting element 32 (FIG. 4).

The two housings 8A, 8B are preferably configured, and the bus bars 14A, 14B are disposed, in such a way that the connection between the two bus bars is made automatically and directly when the two boxes 4, 6 are connected to one another. As a supplement to this automatic connection, an additional connection can be made via a connecting element 32. In what follows, a plurality of embodiment variants of the automatic connection of the two bus bars 14A, 14B are explained. The different types of bus bar that are illustrated in the figures can be combined as desired with the various types of housing and are therefore not restricted to the respective pairing of bus bar/housing types illustrated in the figures.

Figure 5A:
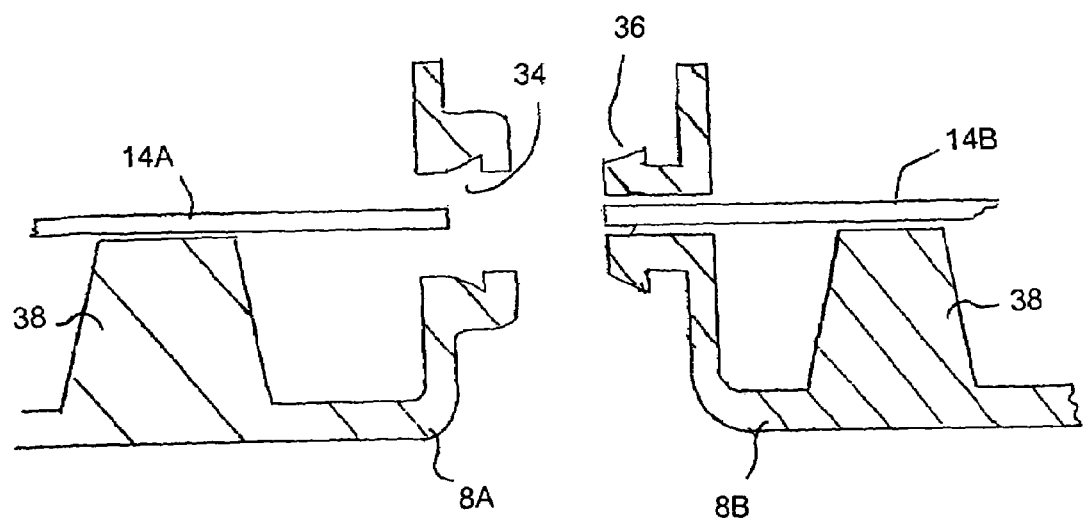
FIG. 5A is a diagrammatic, sectional view of a snap-action or latching connection according to a first embodiment variant.
Figure 6A:
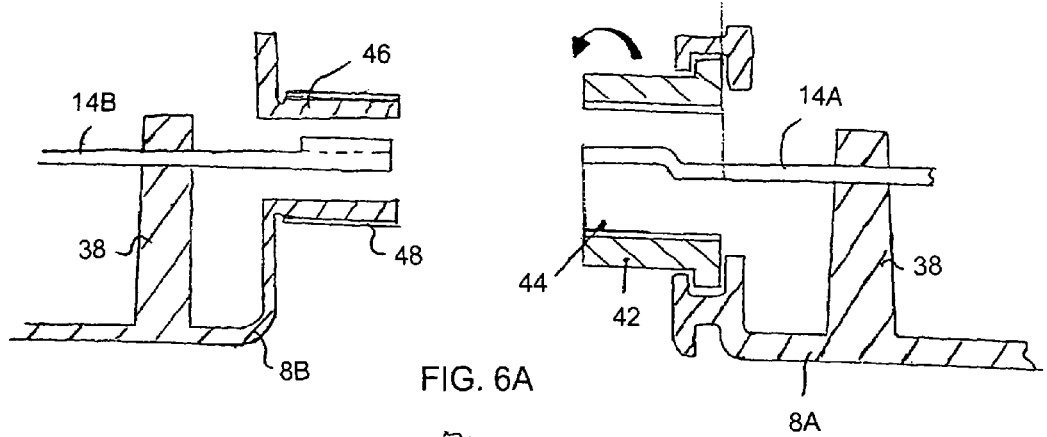
FIG. 6A is a diagrammatic, sectional view of a screw connection for connecting the two boxes according to a second embodiment variant.
Figure 6B:
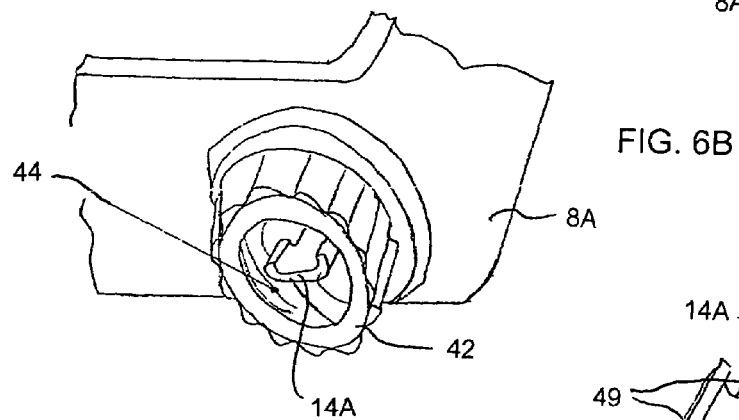
FIG. 6B is a diagrammatic, partial perspective view of part of such a screw connection.
Figure 6C:
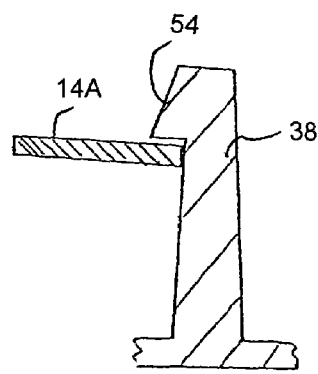
FIG. 6C is a diagrammatic, side view of a counter bearing.
Figure 6D:
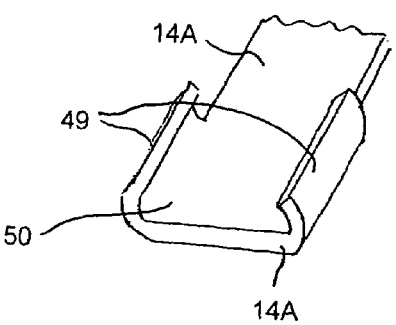
FIG. 6D is a diagrammatic, exploded perspective view of the first and second bus bars which are of complementary configuration in order to form a clamping connection.
Figure 6D:
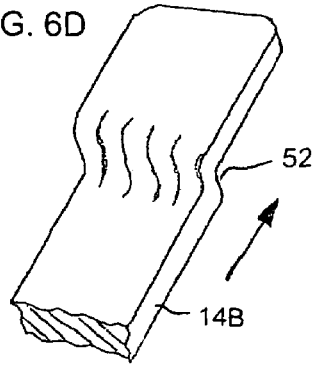

According to a first variant which is illustrated in FIGS. 5A–5C, the two housings 8A, 8B are connected to one another via a snap-action connection which forms a rear engagement. For this purpose, the housing 8A has a snap-action receptacle 34, and the housing 8B has a snap-action hook 36. Both elements are of a substantially circular configuration and can be slotted in order to make available the necessary elasticity.

In the region of the snap-action elements 34, 36, in each case a counter bearing 38, on which the bus bars 14A, 14B are supported, is formed on the housings 8A, 8B. The bus bars 14A, 14B extend centrally through the snap-action elements 34, 36. When the housings 8A, 8B are joined, the bus bars 14A, 14B are pressed one against the other, their end faces forming contact faces 40. In order to increase the contact face and the reliability of contact, in the region of the contact faces 40 the bus bars 14A, 14B are configured, for example, with a T shape (FIG. 5C) or are of contoured configuration, for example with a corrugated contour according to FIG. 5D or a prong or pin profile according to FIG. 5E. The contouring has the additional advantage of having a centering effect.

In the embodiment variant according to FIGS. 6A–6D, the two housing parts 8A, 8B are screwed one against the other. For this purpose, a captively secured nut 42 with internal thread 44 is provided on the housing 8A. The housing 8B has, in a complementary fashion thereto, a cylindrical screw attachment 46 with external thread 48. In order to connect the two housings 8A, 8B, the nut is screwed onto the screw attachment 46. In the process, the two bus bars 14A, 14B (see in this respect in particular FIG. 6D) are pushed one into the other in order to form a clamping connection. The first bus bar 14A has, for this purpose, two clamping limbs 49 which are bent at the edges and in the upward direction in the contact region and which form a guide 50 into which the second bus bar 14B is automatically inserted with a bent part as far as a stop 52. In this embodiment variant also, a counter bearing 38 (illustrated in a side view in FIG. 6C) is provided. According to this, the bus bar 14A is prevented from moving away in the upward direction by a projection 54. Alternatively, the bus bar 14A can also or additionally be guided on its underside.

In a further exemplary embodiment according to FIGS. 7A–7C, the two housings 8A, 8B are pushed one against the other, and in the process one into the other, in the direction of the arrows perpendicularly to the extension direction of the bus bars 14A, 14B. In the two previous exemplary embodiments, the housings 8A, 8B were pushed one against the other or plugged one into the other in the extension direction of the bus bars 14A, 14B. In the exemplary embodiment according to FIGS. 7A–7C, an attachment pin 56 is formed on the housing 8A, and a pin receptacle 58 is formed on the housing 8B. These two elements each taper in the plugging-in direction and have a jagged external contour in the manner of a fir tree.

At the same time, the breakthroughs 16 are disposed directly next to the two elements 56, 58 on the two housings 8A, 8B and are each embodied in the manner of a semicircle and are open to the underside or upper side of the housing.

In order to make contact between the two bus bars 14A, 14B, the bus bars 14A, 14B are bent in opposite directions to one another in the region of their opposite contact faces 40 so that they are pressed one against the other with their bent contact faces 40 when the two housings 8A, 8B are joined. The two bus bars 14A, 14B are permanently clamped in here against the counter bearing 38 by a screw. The bus bars 14A, 14B have a certain elasticity and are configured in such a way that when they are placed in contact with one another they are pressed one against the other counter to the spring force brought about by the elasticity. In this configuration, the bus bars 14A, 14B can be deformed into the position illustrated by dashed lines.

In the two first exemplary embodiments in FIGS. 5A–5E or 6A–6D, the bus bars 14A, 14B are guided centrally by the connecting elements which connect the two housings 8A, 8B. The breakthroughs brought about by the connecting elements can expediently be closed or are closed for as long as the two boxes 4, 6 are not connected to one another, in order to ensure both electrical insulation and a hermetic seal, in particular between the base box 4 and the surroundings. For this purpose, there may be provision, for example, for a rubber bush to be inserted into the snap-action receptacle 34 of the housing 8A, or for a sealing stopper to be screwed into the nut 42. The breakthroughs 16 and the pin receptacle 58 according to the embodiment variant according to FIGS. 7A–7C are closed, for example, by housing parts which can be broken away or else by rubber bushes.

This application claims the priority, under 35 U.S.C. § 119, of German patent application No. 103 23 550.7, filed May 24, 2003; the entire disclosure of the prior application is herewith incorporated by reference.

We claim:

1. A fuse box for a vehicle, the fuse box comprising:
a base box having a housing;
a first bus bar having a battery connection terminal and disposed in said base box;
fuses disposed in said base box;
a plurality of outgoing connecting lines connected to said first bus bar through said fuses;
an extension box configured for attachment to said base box;
a second bus bar disposed in said extension box; and
at least one of said housing and said extension box having a breakthrough formed therein for allowing contact to be made between said first and second bus bars, and in a basic state without said extension box connected, said breakthrough of said base box is closed.

2. The fuse box according to claim 1, wherein said first bus bar is configured for making contact with said second bus bar.

3. The fuse box according to claim 1, wherein when said extension box is connected to said base box, its power supply is provided exclusively via said first bus bar and said battery connection terminal which is connected to said first bus bar.

4. The fuse box according to claim 1, wherein when said extension box is connected, said first and second bus bars are placed directly in contact with one another.

5. The fuse box according to claim 1, wherein said base box and said extension box can be stacked one on top of another.

6. The fuse box according to claim 1, further comprising a connecting element, and when said extension box is connected, said first and second bus bars are clamped directly one against the other by said connecting element.

7. The fuse box according to claim 1, further comprising a current conductor plate, said first and second bus bars are placed in contact with one another by said current conductor plate.

8. The fuse box according to claim 1, wherein said first and second bus bars are of complementary configuration to each other for forming a clamping connection.

9. The fuse box according to claim 8, wherein said first bus bar has two clamping limbs which form a guide for receiving said second bus bar.

10. The fuse box according to claim 9, wherein said second bus bar is bent to form a stop up to which said second bus bar can be inserted into said guide.

11. The fuse box according to claim 1, wherein said first and second bus bars are of a contoured configuration on their opposite contact faces.

12. The fuse box according to claim 11, wherein said first and second bus bars are held in a sprung position and when said extension box is connected they are pressed one against the other counter to a spring force.

13. The fuse box according to claim 12, wherein said first and second bus bars are bent in opposite directions with respect to one another in a region of said contact faces.

14. The fuse box according to claim 1, wherein said first and second bus bars are configured and disposed such that when said housing is connected to said extension box said first and second bus bars are placed in contact with one another automatically.

15. The fuse box according to claim 14, further comprising a screw connection for connecting said housing to said extension box.

16. The fuse box according to claim 15, wherein when said extension box is connected, said first and second bus bars are guided by said screw connection.

17. The fuse box according to claim 14, further comprising a latching connection for connecting said housing to said extension box.

18. The fuse box according to claim 17, wherein when said extension box is connected, said first and second bus bars are guided by said latching connection.

19. The fuse box according to claim 1, wherein:
said first and second bus bars have contact faces; and
at least one of said housing and said extension box has a counter bearing for one of said first and second bus bars in a region of said contact faces.

* * * * *